United States Patent [19]

Walters

[11] Patent Number: 4,617,658

[45] Date of Patent: Oct. 14, 1986

[54] FRAME ARRANGEMENT FOR MULTIPLEXING A PLURALITY OF SUBCHANNELS ONTO A FIXED RATE CHANNEL

[75] Inventor: Stephen M. Walters, Holmdel, N.J.

[73] Assignee: Bell Communications Research, Inc., Livingston, N.J.

[21] Appl. No.: 724,199

[22] Filed: Apr. 17, 1985

[51] Int. Cl.[4] .......................... H04J 3/16; H04J 3/00; H04J 3/12

[52] U.S. Cl. ........................................ 370/84; 370/99; 370/110.1

[58] Field of Search ................. 370/84, 99, 110.1, 111

[56] References Cited

U.S. PATENT DOCUMENTS

| | | | |
|---|---|---|---|
| 3,207,851 | 9/1965 | Fukinuki | 370/99 |
| 3,710,056 | 1/1973 | Tomozawa | 370/99 |
| 3,749,839 | 7/1973 | Fornasiero et al. | 370/99 |
| 3,970,799 | 7/1976 | Colton et al. | 370/110.1 |
| 3,982,074 | 9/1976 | Clark | 370/99 |
| 4,520,479 | 5/1985 | Grima et al. | 370/84 |
| 4,538,286 | 8/1985 | McNesby et al. | 370/84 |

OTHER PUBLICATIONS

Electronics and Communications in Japan, "Time Division Multiplexing of Signals with a Plurality of Information Rates in Which Original Signal Intervals of Symbol Intervals of Individual Signals are Preserved", vol. 53-A, No. 12, Dec. 1970, pp. 35-44.

IBM Technical Disclosure Bulletin, vol. 23, No. 6, Nov. 1980, "Programmable Variable Speed Scanner", Sellier. Electronics, vol. 51, No. 4, Feb. 1978, "EPROM Achieves Nonuniform Data-Channel Sampling", Bowles et al., pp. 110-113.

Primary Examiner—Douglas W. Olms
Assistant Examiner—Frank M. Scutch, III
Attorney, Agent, or Firm—James W. Falk; Stephen M. Gurey

[57] ABSTRACT

In order to multiplex a plurality of various rate subchannels onto a fixed rate channel, a frame structure is defined consisting of j sets of i-tuples for a total of ij bits per frame, the parameters i and j being mathematically determined as a function of the rate of the subchannels and the rate of the fixed channel. For j-1 of the i-tuples, i-1 bits are used for information and the last bit is set ONE. In one i-tuple all i bits are set ZERO. Framing is detected by monitoring for a ONE followed by i ZEROes, a pattern which cannot occur elsewhere in the frame regardless of the data. An integral number of information bits from each subchannel are distributed in the (i-1)(j-1) information bit positions. In the disclosed embodiment two 666⅔ bps channels and a 4800 bps channel are multiplexed onto an 8000 bps channel using a frame structure consisting of 24 quintets. In the 92 information bit positions, 72 bits are allocated for the 4800 bps channel and 10 bits each are allocated for the 666⅔ bps channels.

10 Claims, 11 Drawing Figures

FRAME ARRANGEMENT FOR MULTIPLEXING A PLURALITY OF SUBCHANNELS ONTO A FIXED RATE CHANNEL

BACKGROUND OF THE INVENTION

This invention relates to multiplexing a plurality of various rate subchannels onto a fixed rate channel and more particularly to defining a frame structure that accomplishes this.

In order to multiplex a plurality of various rate digital subchannels onto a fixed rate digital channel, the rate of each subchannel is generally converted to a standard rate and the converted subchannels are then multiplexed using time-division multiplexing (TDM) techniques. Depending on the rates of the subchannels, such an arrangement can make inefficient use of the capacity of the high speed channel.

Framing of the high speed channel in such TDM systems, as for example, the T1 carrier system, is accomplished by one framing bit in a 193 bit frame that also includes 24 8-bit multiplexed digital channels. Framing is established and maintained by hardware recognition of a specific pattern of those framing bits in successive frames. The hardware necessary to recognize such a framing pattern is necessarily sophisticated. Furthermore, once framing is lost, several frames are required to re-lock upon the framing pattern. In addition if the data in successive frames simulates the framing pattern, improper reframing may occur.

It is desirable therefore to define a frame structure that can be used to multiplex several subchannels of varying rates such that each subchannel is assigned an integral number of bits per frame and in addition includes sufficient information in each frame to enable framing to be unambiguously and easily detected.

SUMMARY OF THE INVENTION

In order to multiplex a plurality of various rate subchannels onto a fixed rate channel, a frame structure is defined consisting of j sets of i-tuples for a total of ij bits per frame, the parameters i and j being mathematically determined as a function of the rates of the subchannels and the rate of the fixed channel. For $j-1$ of the i-tuples, $i-1$ bits are used for information and one bit at either end of the i-tuple is set ONE (or ZERO). In one of the i-tuples, all i bits are set ZERO (or ONE). Framing is thus detected by monitoring for i successive ZEROes (or ONEs) followed or preceded by a ONE (or ZERO), which cannot occur elsewhere in the frame regardless of the data pattern. An integral number of information bits from each subchannel are distributed throughout the frame in the remaining $(i-1)(j-1)$ bit positions so that the required rate for each subchannel is provided.

The framing structure of the present invention enables framing to be detected with simple and inexpensive hardware. Furthermore, reframing can be achieved in only one frame. In addition, the framing structure of the present invention is not dependent upon any special services of the transmission medium and could be transmitted using any binary channel irrespective of the transmitted bit formats.

DETAILED DESCRIPTION

In order to define a frame structure to multiplex a plurality of subchannels certain necessary conditions must be specified. Considering the multiplexed output to be operating at a given rate of R bits per second and m subchannels to be multiplexed together onto this channel where the rate of the kth subchannel, $1 \leq k \leq m$, is $r(k)$ it is necessary that:

$$\sum_{k=1}^{m} \{r(k)\} < R \quad (1)$$

to permit some bits to be allocated for framing purposes.

Each of the rates $r(k)$ can be normalized by dividing by the common channel rate, R, to yield:

$$s(k) = \frac{r(k)}{R} = \frac{u(k)}{q(k)} \quad (2)$$

where $u(k)$ and $q(k)$ form an irreducible ratio. A fundamental requirement of each subchannel is that integers $u(k)$ and $q(k)$ can be found. Since, in usual practice, R, is an integer and each $r(k)$ is rational, this condition is normally satisfied. The ratio, $s(k)$, represents the fraction of channel capacity, R, required to service subchannel k. It follows that:

$$\sum_{k=1}^{m} s(k) < 1. \quad (3)$$

The least common multiple of the denominators, $q(k)$ is defined as Q:

$$Q = LCM\{q(k)\}. \quad (4)$$

Then, s(k) can be expressed as:

$$s(k) = \frac{\frac{Q}{q(k)} u(k)}{Q} \text{ or} \quad (5a)$$

$$s(k) = \frac{P(k)}{Q}. \quad (5b)$$

Since Q is the least common multiple of $\{q(k)\}$, then, for all k, q(k) divides Q exactly. Therefore, p(k) is an integer.

Since the channel being subdivided is organized into frames, it is necessary that each frame be Q (or a multiple thereof) bits in length. This achieves the only possible basic cycle(s) in which an integral number of bits per frame can be assigned to each subchannel to provide the required rate, r(k). Therefore, to meet the required capacity for each subchannel within each frame, subchannel k is assigned p(k) bits (or a multiple of p(k), the multiplier being the same as that for Q).

Letting P denote the sum of the numerators of s(k):

$$P = \sum_{k=1}^{m} p(k), \quad (6)$$

the value P represents the total number of bits which must be reserved for information in each frame of Q bits. The fraction of the channel utilized to carry information is therefore P/Q:

$$\frac{P}{Q} = \frac{\sum_{k=1}^{m} r(k)}{R}. \quad (7)$$

Then, on the average, each bit transmitted through the channel represents a fraction, P/Q, of an information bit. The number of spare bits, D, in each frame of length Q which can be utilized for framing is thus:

$$D = Q - P. \quad (8)$$

Since $P < Q$, $D \geq 1$. If x denotes the frame multiplier, then xQ is the length (in bits) of the frame, xP is the required number of information bits per frame and framing can utilize up to xD bits per frame. If N denotes the length of a frame and I denotes the actual number of information bits provided during each frame, then any acceptable frame will have:

$$\begin{aligned} N &= xQ \quad x = 1,2,3, \ldots \\ I &\geq xP; \quad \text{and} \\ N - I &\leq xD. \end{aligned} \quad (9)$$

Large values of x thus, obviously, yield more spare bits to be used for framing with the penalty of having longer frames.

Figure 1:
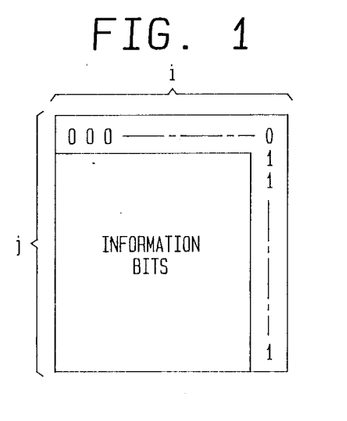
FIG. 1 is an illustration of the frame organization in accordance with the present invention containing j i-tuples of which $(i-1)(j-1)$ bits are information bits.

The mathematical analysis hereinabove will be applied in defining the parameters of the frame structure of the present invention. With reference to FIG. 1, the frame, shown for simplicity in two dimensions, consists of j sets of i-tuples, transmission being from left to right, top to bottom. Each i-tuple has a region of i-1 bits used for information and a set ONE in the ith position. This is true for all except the first i-tuple which is set to ZERO in each of the i bits. Due to the set ONE in the last bit position of these j-1 i-tuples, nowhere in the frame can an all ZERO i-tuple be found except for the first one. Thus, by monitoring for a ONE followed by i successive ZEROes, the start of a frame can be located. As will be described in detail hereinafter, the combination necessary to detect this occurrence uses standard and simple hardware. It is apparent that the last bit of each i-tuple could equally be a ZERO and the first i-tuple be all ONEs. Also, the first bit of each i-tuple rather than the last could be ONE (or ZERO).

The determination of the parameters i and j from the rates of the subchannels and the rate of the channel are derived hereinbelow using the aforedescribed mathematical analysis. Using the previous notation:

$$N = ij \text{ and} \quad (10)$$

$$I = (i-1)(j-1). \quad (11)$$

The necessary and sufficient conditions on i and j are:

$$ij = xQ \; x = 1,2,3 \text{ and}$$

$$(i-1)(j-1) \geq xP$$

which can be manipulated to:

$$ij = xQ \text{ and} \quad (12)$$

$$i + j - 1 \leq xD. \quad (13)$$

These systems of equations must be satisfied. Thus, given a set of subchannel rates, r(k), and a channel into which they are to be multiplexed operating at rate R, values for Q and D can be calculated. Then, values for (i, j) must be found which, for some integer $x \geq 1$, satisfy the equations.

A procedure to determine (i, j) and x follows. Considering a single i-tuple (other than the first) of the pattern in FIG. 1, the number of information bits represented on average is (P/Q)i since, as aforenoted, each bit of a frame represents P/Q information bits. For sufficient capacity to be provided, the following inequality must hold since i−1 of the i bits can actually be used as information bits:

$$i - 1 > (P/Q)i, \quad (14a)$$

which reduces to:

$$i > Q/D. \quad (14b)$$

If this inequality is met, some spare capacity is available in each i-tuple. That is, i−1 out of i bits, $i > Q/D$, are (fractionally) sufficient to carry the information. A similar argument can be applied to j, requiring $i > Q/D$ and $j > Q/D$. The extra capacity per i-tuple is expressed by:

$$i - 1 - (P/Q)i \quad (15a)$$

which reduces to:

$$(D/Q)i - 1. \quad (15b)$$

Generally, the spare capacity per i-tuple will only be a fraction of a bit, but if enough i-tuples are used, an adequate number of spare bits can be accumulated to compensate for the first i-tuple in which no information is sent. The required spare capacity is expressed by (P/Q)i. Thus, to accumulate the required capacity in j−1 i-tuples, it is necessary that:

$$(j-1)\left(\frac{D}{Q}i - 1\right) \geq \frac{P}{Q}i \quad (16)$$

which when solved for j yields:

$$j \geq \frac{Qi - Q}{Di - Q}. \quad (17)$$

This is the minimum value of j which allows the information to be inserted. As i increases, it can be noted that j approaches its absolute minimum, Q/D. Values for j which are larger than its minimum are acceptable and accumulate greater space capacity and in fact, a larger value must ordinarily be used since it is still required that $ij=xQ$. This is equivalent to finding j (greater than the minimum) for which Q divides ij. This can be found iteratively by starting at the minimum and incrementing j until a value is found for which Q divides ij. At most, Q iterations are required. This implies that:

$$\frac{Qi - Q}{Di - Q} \leq j \leq \frac{Qi - Q}{Di - Q} + Q \quad (18)$$

Using this procedure, a value of j can be found for every value of i, i>Q/D which satisfies equations (12) and (13).

An alternative approach for determining j in a fewer number of iterations is to base the iteration on x, the frame multiplier. The minimum value for j in equation (17) is used as follows:

$$xQ = ij \quad (19)$$

$$xQ \geq i \frac{Qi - Q}{Di - Q}$$

$$x \geq \frac{i(i - 1)}{Di - Q}.$$

Thus, given this minimum for x, an iteration on x can be performed until a value is found such that i divides xQ exactly. At most i iterations are required for this procedure.

Figure 2:
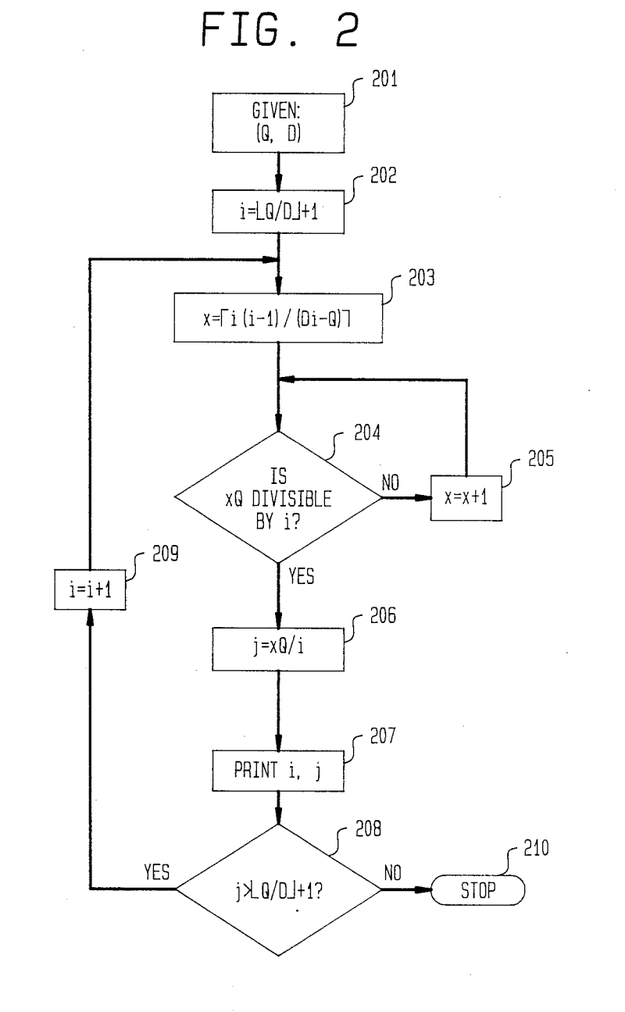
FIG. 2 is a flow chart for determining the parameters i and j from the rates of the subchannels and the fixed channel.

FIG. 2 shows a flow chart of a procedure to determine all the (i, j) possibilities once Q and D are determined from the rates r(k) of the subchannels and the common channel rate, R. As aforenoted Q is the least common multiple of {q(k)} and is the minimum frame length in which an integral number of bits per frame can be assigned to each subchannel to provide the required rate. As aforenoted D denotes the number of spare bits in each frame of length Q. With reference to FIG. 2, given Q and D at step 201, the minimum i is calculated at step 202 (from equation [14]). It should be noted that $\lfloor L \rfloor$ denotes the largest integer less than or equal to L while $\lceil L \rceil$ denotes the smallest integer greater than or equal to L. The frame multiplier x is calculated at step 203 using equation (19). At decision box 204, xQ is divided by i. If i does not divide xQ exactly, x is incremented by 1 and a determination whether i divides xQ is again made at 204. If i does divide xQ exactly, j is calculated at step 206 and one set of (i, j) parameters is determined. If j is greater than the minimum j at step 208, i is incremented by 1 at step 209 and a new x and j calculated. The procedure continues to produce (i, j) pairs until a value for j is found which equals the absolute minimum $\lfloor Q/D \rfloor + 1$, at which step the process stops, 210. As is apparent, this procedure is readily implemented in a computer program.

A frame arrangement for a specific numerical example will be derived below and a specific hardware implementation of a multiplexer and demultiplexer incorporating that arrangement will be described in detail thereinafter.

In the specific example, a subchannel at 4800 bps and two subchannels at 666⅔ bps (such as the A/B signaling channels in T1 carrier system) are to be multiplexed onto an 8000 bps channel. Then:

$R = 8000$ and $r(1) = 4800,$ $r(2) = 666\frac{2}{3},$ and $r(3) = 666\frac{2}{3}.$ Normalizing the rates r(k) by R:

$$s(1) = \frac{4800}{8000},$$

$$s(2) = \frac{2000}{3 \times 8000}, \text{ and}$$

$$s(3) = \frac{2000}{3 \times 800}.$$

Reducing each s(k) to an irreducible ratio:

$s(1) = 3/5$, $s(2) = 1/12$, and $s(3) = 1/12$.

Q can now be found:

$Q = LCM\{5, 12\} = 60$ and adjusting each s(k):

$s(1) = 36/60$, $s(2) = 5/60$, and $s(3) = 5/60$.

The parameters are:

$Q = 60$, $P = 46$, and $D = 14$.

Applying these parameters to the flow chart in FIG. 2:

$$i = \left\lfloor \frac{60}{14} \right\rfloor + 1 = 5$$

$$x = \left\lceil \frac{5 \times 4}{14 \times 5 - 60} \right\rceil = 2$$

Since 5 exactly divides $2 \times 60$:

$$j = \frac{2 \times 60}{5} = 24.$$

Figure 3:
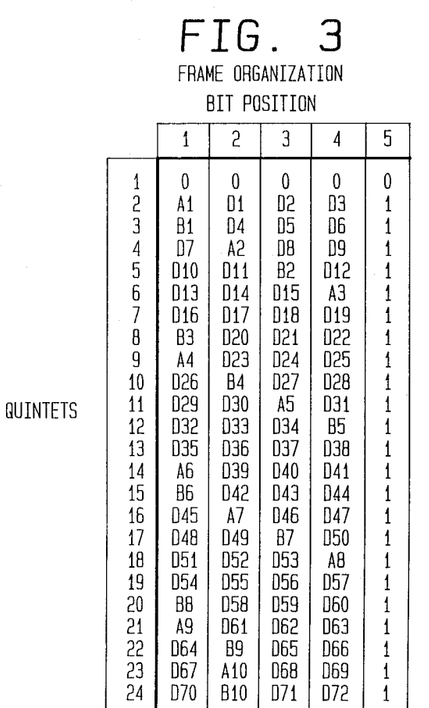
FIG. 3 is the frame organization for an illustrative embodiment that multiplexes two $666\frac{2}{3}$ bps subchannels and a 4800 bps subchannel onto an 8000 bps channel.

Accordingly, (5, 24) is one possible solution. One frame solution thus consists of 24 quintets (five-tuples) and is 120 bits long. Other frame solutions could be found but 120 bits is the minimum frame length that satisfies the mathematical constraints. Out of the 120 bits, $3/5 \times 120 = 72$ bits are allocated for the 4800 bit channel and $1/12 \times 120 = 10$ bits are allocated per A and B channels. The twenty-eight remaining bits are used for framing: 5 ZEROes in the first quintet and ONE in the 5th bit position for the 23 other quintets. FIG. 3 shows a frame arrangement of the 4800 bps channel D bits (D1 through D72) and the 666⅔ bps A and B bits (A1 through A10 and B1 through B10, respectively). It should be noted that the arrangement of A, B and D bits in the 92 information bit positions is not unique. Rather the bits have been distributed throughout the frame to minimize delay between reception of an A, B or D bit and transmission of that bit in the multiplexed stream.

The multiplexer shown in FIG. 4, which implements the above described framing scheme, will be described in conjunction with the clock timing diagrams of FIG. 5, the bit timing diagrams of FIG. 6 and the bit selection diagrams of FIG. 7.

Figure 4:
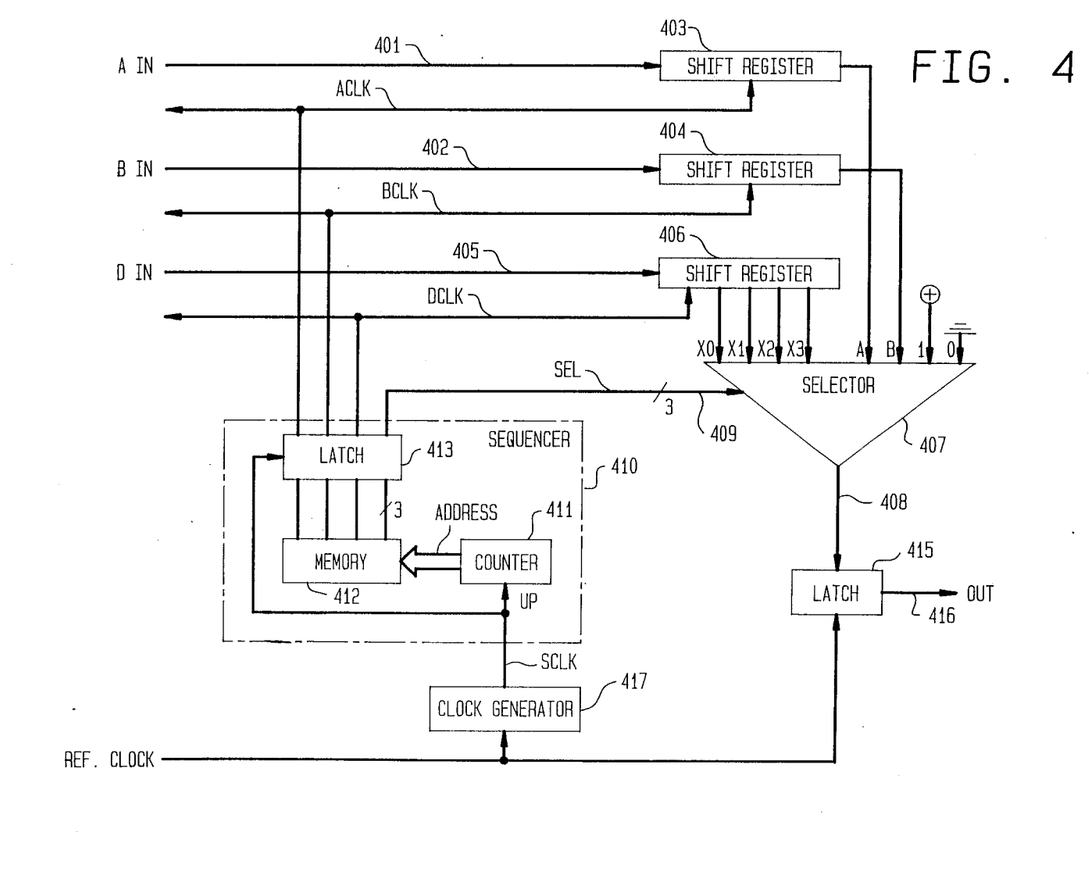
FIG. 4 is a block diagram of a multiplexer that multiplexes the aforenoted three subchannels using the frame arrangement of FIG. 3.

With reference to FIG. 4, the A signaling bits on lead 401 and B signaling bits on lead 402, both at a 666⅔ bps rate, are clocked into single bit shift registers 403 and 404 in response to 666⅔ Hz clock signals ACLK and BCLK, respectively. The D bits at a 4800 bps rate on lead 405 are simultaneously clocked into a 4-bit shift register 406 in response to a 4800 Hz clock, DCLK. The A and B outputs of shift registers 403 and 404 respectively, and the four outputs of shift register 406, X0, X1, X2 and X3, are provided as inputs to a selector 407. Additional inputs to selector 407 include a dc voltage representative of the logical value ONE and a grounded input representative of the logical value ZERO.

Selector 407 outputs on lead 408 one of its eight bit inputs (X0, X1, X2, X3, A, B, 1, or 0) as determined by a 3-bit code SEL provided to it over three parallel leads 409 from a sequencer 410. Sequencer 410 includes a counter 411, a memory device 412 such as a ROM and a latch 413. Memory 412 generates the SEL code in response to the address applied thereto as determined by the count of counter 411.

An 8 kHz reference clock, which may be derived from an external source provides signals for synchronizing the A, B and D input signals and the multiplexed output signal. It directly drives the 8000 bps multiplexed output signal by strobing latch 415 which transfers the selected bit on lead 408 to the multiplexer output 416. The reference clock drives a clock generator 417 which contains a phase locked loop operating at 24 kHz. The resultant 24 kHz SCLK clock output of generator 417 is at a rate that is the least common integral rate of the A, B, D and output channels.

Counter 411 is driven by the SCLK clock, its count being incremented by each SCLK pulse. Counter 411 repetitively counts from 0 to 359, providing to memory 412, 360 possible addresses. In response to the count, memory 412 generates the aforenoted selection code SEL on parallel leads 409 when latch 413 is strobed by the 24 kHz SCLK clock. Since the output of selector 407 is latched to multiplexer output 416 at the 8 kHz reference clock rate, the selection codes generated only at each third count of counter 411 control the selection of input bits to the multiplexed output stream.

In addition to generating the selection code SEL, memory 412 generates the three clock signals ACLK, BCLK and DCLK at 666⅔ Hz, 666⅔ Hz and 4800 Hz, respectively. As aforenoted, these three clock signals clock the A, B and D bits into shift registers 403, 404 and 406, respectively. In addition, the ACLK, BCLK and DCLK clock signals are provided to circuitry external to the multiplexer to synchronize the external submission of data to the shift registers 403, 404 and 406. Timing of these clock signals and the phase relationships therebetween are determined by the memory 412 which provides three high/low outputs at each count of counter 411 and which are strobed through latch 413 at the SCLK clock rate. Obviously, the frequency of the ACLK, BCLK and DCLK clocks is determined by the rate of change of the outputs as determined by the memory 412.

Figure 5:
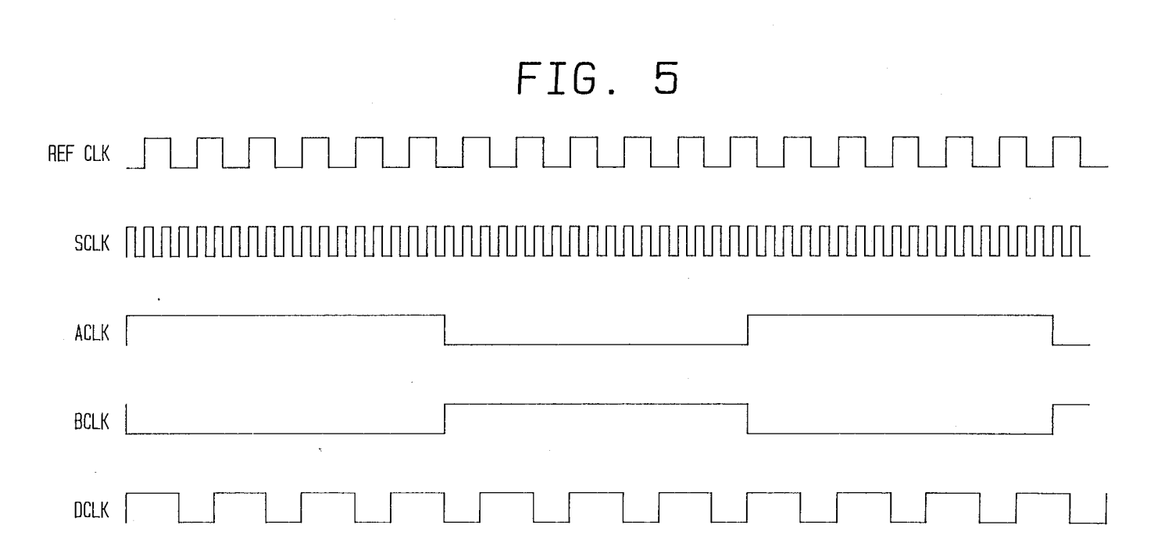
FIG. 5 shows the clock signals used in the multiplexer of FIG. 4.
Figure 6:
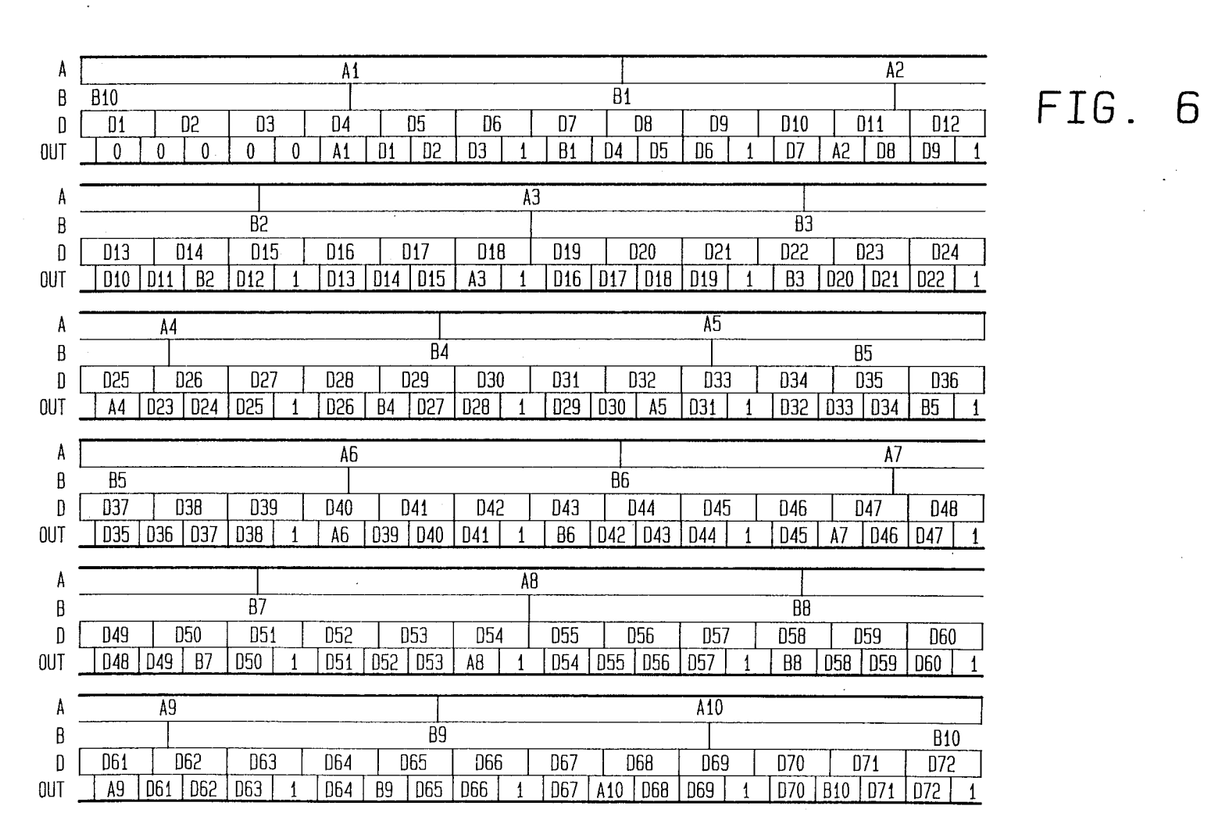
FIG. 6 shows the bit timing relationships between the input bit streams and the multiplexed output stream associated with FIG. 4.
Figure 7:
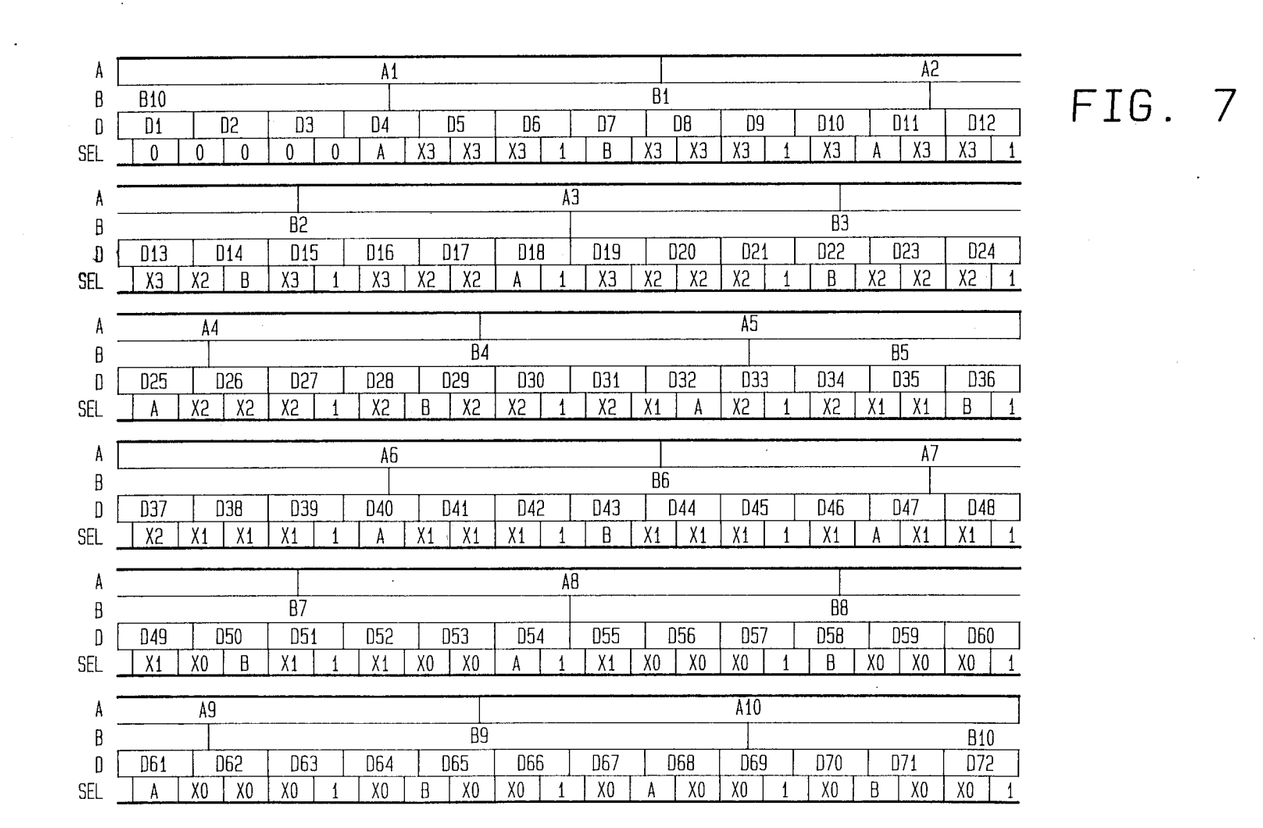
FIG. 7 shows the bit selection required by the multiplexer in FIG. 4 to form the output bit stream.

Timing of the various clock signals, timing of the A, B and D input bit streams with respect to the multiplexed output bit stream, and bit selection of selector 470 are more readily understood with reference to FIGS. 5, 6 and 7 respectively. With reference to FIG. 5, and 8 kHz reference clock and the derived SCLK clock at three times the reference clock rate are shown. In addition, the ACLK and BCLK clocks at one-thirty-sixth the rate of the SCLK clock, and DCLK at one-fifth the rate of the SCLK clock are shown. Although the phase differences between the reference, the ACLK, BCLK and DCLK clocks can be any integral number of SCLK pulses, the clock signals are timed in a manner to minimize delay between the detection of the input bits in the three streams and their output in the multiplexed stream. Accordingly, the ACLK and BCLK clocks are 180° out of phase. For convenience, the rising edge of the first DCLK pulse is shown coincident with the rising edge of the first ACLK pulse. These rising edges are one SCLK pulse ahead of the rising edge of the reference clock which is determined by the desired bit timing of the multiplexed output stream, described hereinafter.

The bit timing diagrams in FIG. 6 show the timing relationships between the bits in the A, B and D input bit streams arriving at 666⅔ bps, 666⅔ bps and 4800 bps, respectively, and the bits in the multiplexed bit stream leaving at 8000 bps, for one frame of data. The bits in the input and multiplexed bit streams are numbered in accordance with the frame arrangement of FIG. 3. Thus, the initial five bits are in the multiplexed stream are the five consecutive ZERO framing bits and each fifth bit thereafter is the forced ONE framing bit.

The phase relationships between the input and multiplexed bit streams is such that no bit is required in the multiplexed bit stream before it arrives in one of the input streams. In particular, the phase relationship between the ACLK, BCLK and DCLK clocks and the reference clock is such that output of the last data bit in the frame, D72, is inputted and immediately outputted from the first register of shift register 406. The next four D bits (D1, D2, D3 and D4) are shifted through the register during which time the five bit ZERO quintet is outputted in the multiplexed stream. When bit D1 is required as the seventh bit in the multiplexed stream, it is in the fourth position of the shift register. As can be noted from the bit selection diagrams of FIG. 7, selector 407 thereupon selects X3. By the time the next D bit, D2, is required in the multiplexed stream, D5 has been inputted to shift register 406 and D2 has shifted to the fourth position. Accordingly, as can be noted in FIG. 7, X3 is again selected. Selection codes are readily determined by comparing the bit arrival time and the time at which that bit must be placed in the multiplexed stream.

Since the A and B bit rates are relatively slow compared with the output bit rate, single bit shift registers are sufficient for storing the last arrived A and B bits. Selector 407 can then select the appropriate A or B bit as needed for the output bit stream. As noted in FIGS. 6 and 7, as the frame progresses in time, the time difference decreases between input of a D bit and its output in the multiplexed stream. Accordingly, the bits closer to the input of the shift register are selected by selector 407. For example, only D54 and D55 arrive before D54 is needed for output. Thus, the second bit, X1 is selected. The next bit, D55, is placed in the multiplexed stream before D56 arrives. Accordingly, as can be noted in FIG. 7, X0 is selected.

Figure 8:
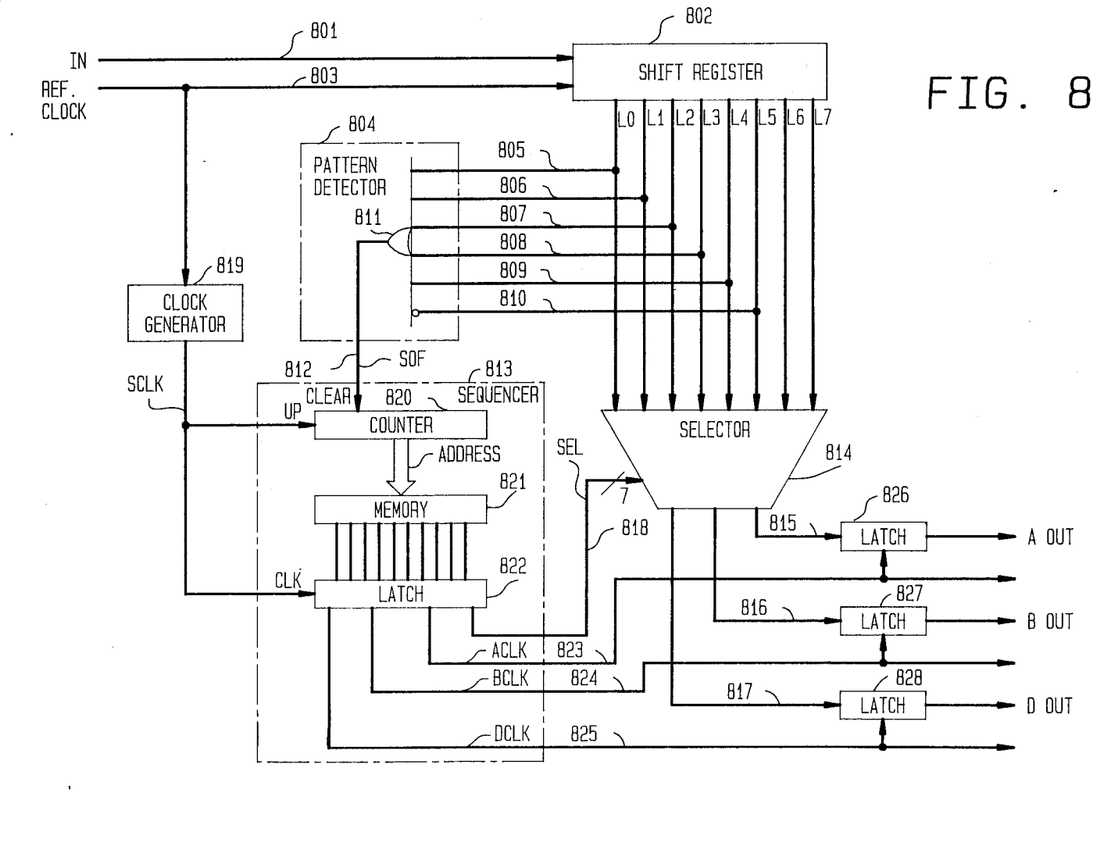
FIG. 8 is a block diagram of a demultiplexer that demultiplexes the multiplexed data stream generated by the multiplexer of FIG. 4.

A demultiplexer that demultiplexes the multiplexed bit stream outputted by the multiplexer in FIG. 4 to reform the A, B and D bit streams is shown in FIG. 8. FIG. 8 will be described in conjunction with the clock timing diagrams of FIG. 9, the bit timing diagrams of FIG. 10 and the bit selection diagrams of FIG. 11.

With reference to FIG. 8, the multiplexed bit stream at the 8000 bps rate is clocked into shift register 802 by the 8 kHz reference clock signal on lead 803. This reference clock signal is externally derived from the received signal at the line interface. Shift register 802 has eight bit storage locations, the stored bits being available on eight outputs, L0, L1, L2, L3, L4, L5, L6 and L7. The input bits thus shift through shift register 802, the most recent eight bits in the input stream being available for placement into the three demultiplexed output bit streams.

Outputs L0, L1, L2, L3, L4 and L5 are connected to a pattern detector 804. Pattern detector consists of a NOR gate 811 having five positive inputs (805, 806, 807, 808 and 809) and one inverted input (810) connected to the L0, L1, L2, L3, L4 and L5 outputs of register 802, respectively. A positive ONE output is generated by pattern detector 804 only when L0 through L4 are all ZERO and L5 is ONE. Thus, detector 804 is only responsive to the framing pattern of a ONE followed by a ZERO quintet, the SOF output signal on lead 812 initializing sequencer 813 which controls the transfer of the bits on L0 through L7 into the demultiplexed streams.

The L0 through L7 outputs of shift register 802 are connected to a selector 814. Selector 814 has three outputs 815, 816 and 817. In response to a selection code SEL generated by sequencer 813, selector 814 selects for output on leads 815, 816 and 817, three of the bits stored in the shift register to form the A, B and D demultiplexed stream. As will be noted hereinafter in conjunction with the discussion of the bit selection diagrams of FIG. 11, the A and B bits are always selected from amongst the L1, L2, L3 and L4 outputs of register 802. Therefore, only two bits each are required in the selection code SEL to identify which of these four inputs are selected for the A and B outputs. The D bit is selected from amongst L0 through L7. Accordingly, three bits are required to properly identify the selected D bit. The SEL code thus consists of seven bits in parallel format on leads 818.

As in the multiplexer, the 8 kHz reference clock is applied to a clock generator 819 which contains a phase locked loop operating at 24 kHz. The resultant 24 kHz SCLK clock signal is an integral multiple of 8 kHz and the A, B and D bit streams (666⅔ bps and 4800 bps).

Sequencer 813 includes a counter 820 which counts each SCLK pulse applied thereto. Counter 820 is cleared each frame by the SOF signal generated by pattern detector 804. Since SOF is only generated every 120th 8 kHz clock pulse, counter 820, counting at a 24 kHz rate, counts from 0 to 359 each frame.

For each count of counter 820, an address is provided to a memory 821 which generates a 10-bit data word. In response to a strobing SCLK clock, latch 822 outputs the 10-bit data word. Seven of the 10-bits form the SEL word on parallel leads 818. Each of the three other bits generate clocking signals ACLK, BCLK and DCLK for the A and B bit streams at 666⅔ Hz and the D bit stream at 4800 Hz, respectively. These clock signals strobe latches 826, 827 and 828, respectively, which have as their respective inputs the selected A, B and D bits to be placed in the demultiplexed bit streams. Although SEL selection codes are provided to selector 814 at the 24 kHz rate 360 times each frame, only those bits selected coincident with the strobing of one of the latches 826, 827 or 828 are placed in an output stream.

Figure 9:
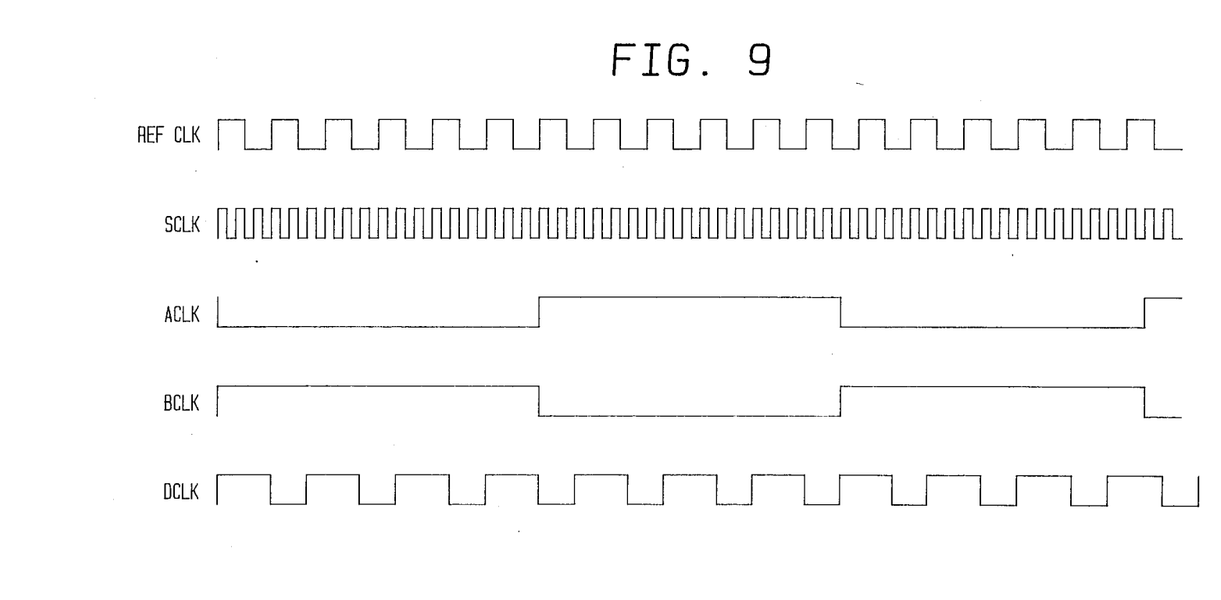
FIG. 9 shows the clock signals used in the demultiplexer of FIG. 8.
Figure 10:
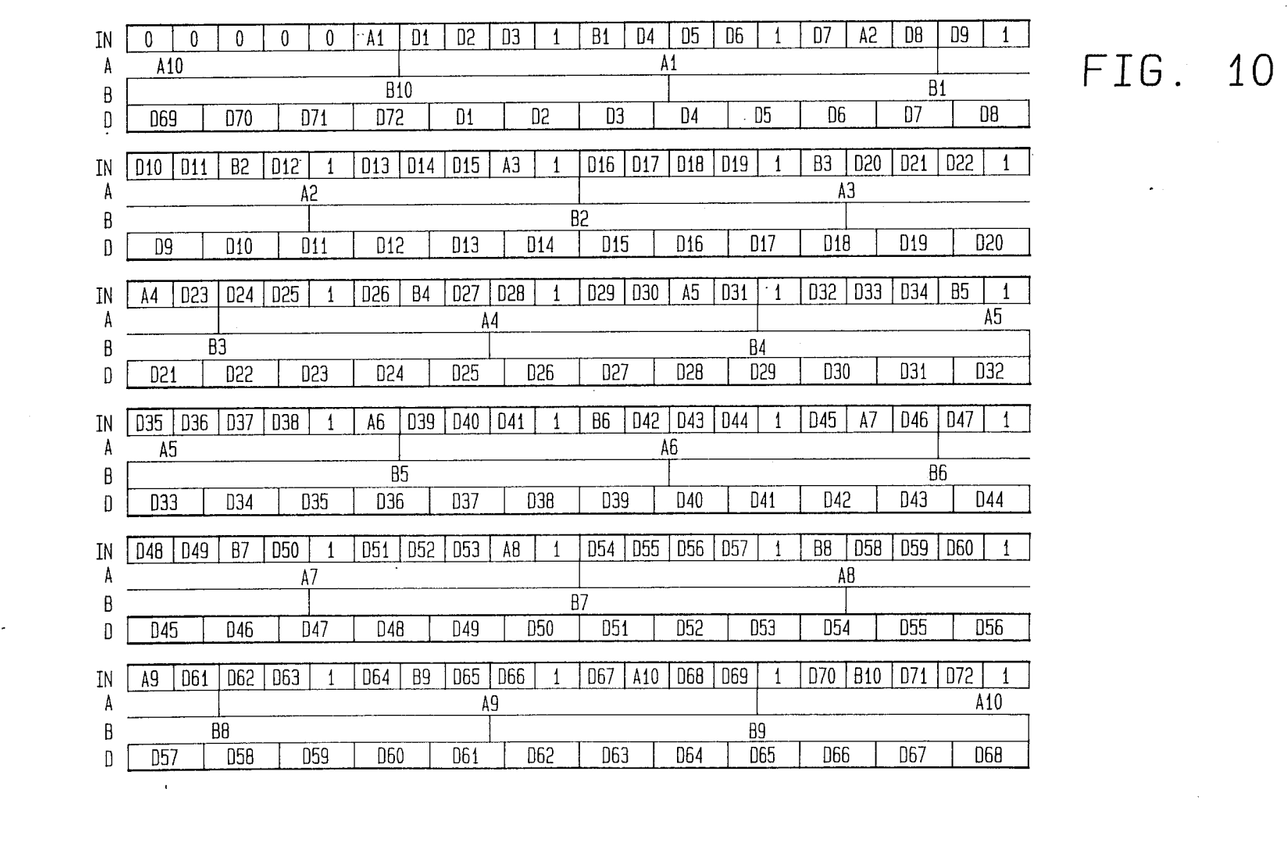
FIG. 10 shows the bit timing relationships between the multiplexed input bit stream and the demultiplexed output bit streams.
Figure 11:
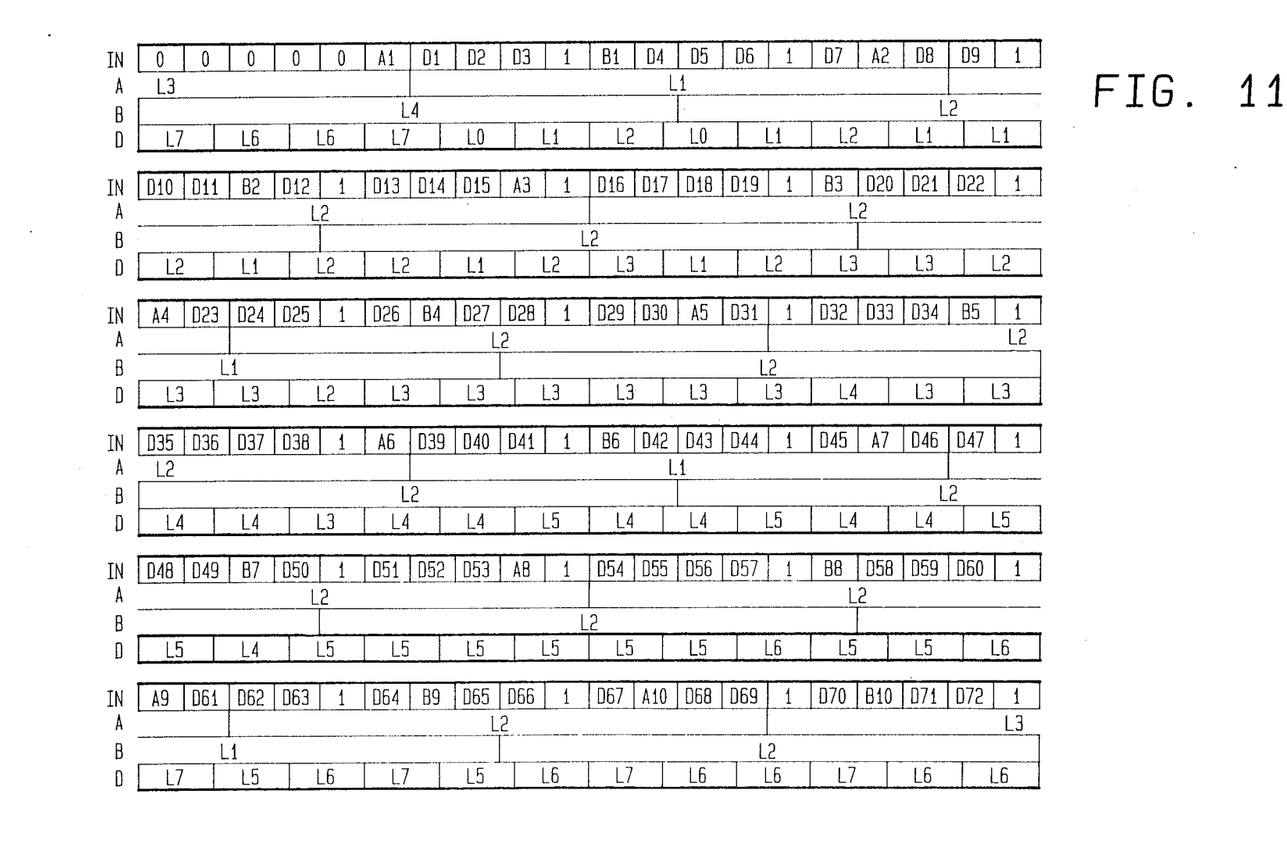
FIG. 11 shows the bit selection required by the demultiplexer in FIG. 8 to form the output bit streams.

Timing of the various clock signals, timing of the multiplexed input bit stream with respect to the demultiplexed A, B and D output bit streams, and bit selection of selector 814 are more readily understood with reference to FIGS. 9, 10, and 11, respectively. With reference to FIG. 9, the 8 kHz reference clock and the derived SCLK clock at 24 kHz are shown. In addition, the ACLK and BCLK clocks at one-thirty-sixth the rate of SCLK, and the DCLK clock at one-fifth the rate of SCLK are shown. For convenience, the rising edges of the first illustrated reference clock pulse, the first SCLK pulse, the first BCLK pulse and the first DCLK pulse are shown coincident in time. The ACLK clock is 180° out of phase with the BCLK clock.

As aforenoted, in response to each reference clock pulse, a bit in the multiplexed data stream is inputted to shift register 802. With reference to FIG. 10, the input data stream consists of successive frames formatted in accordance with the frame organization of FIG. 3, as outputted by the multiplexer of FIG. 4 at an 8000 bps rate. As noted in FIG. 10, the first five bits of the input stream consist of the all ZERO quintet. During this time, the A, B and D bits from the previous frame stored in shift register 802, are placed by selector 814 into the A, B and D output streams. When bit A1 arrives in the input stream it is inputted into the first register. At the next reference clock instant, A1 is shifted to the second bit position in shift register 802 and is required for output in the A output stream. Accordingly, as can be noted in FIG. 11, L1 is selected and that bit is latched through latch 826 into the A output stream. As can be noted in FIG. 11, selector 814 only selects L1, L2, L3 or L4 to form the A and B output streams. Accordingly, as aforenoted, only two bits per A and B selection are required in the SEL code generated by sequencer 813.

The D output bits in the input bit stream are similarly shifted through shift register and selected by selector 814 at the appropriate DCLK instants to be placed in the D output stream. Thus, as noted from FIGS. 10 and 11, D1 is initially shifted into the first bit position and is required to be in the D output stream before the next bit in the input stream (D2) is clocked into register 802. Therefore, L0 is selected to provide D1 on lead 817 and to the D output stream. As the frame progresses, the D output stream is increasingly delayed with respect to the D bits in the input stream due to the rate difference between the input and D bit streams. The bits selected by selector 814 are the "older" bits stored in register 802. For example, D66 is not required in the D output stream until it has been shifted into the eighth bit position of register 802 at which time L7 is selected by selector 814.

The above described embodiment is illustrative of the principles of the present invention. Other embodiments may be devised by those skilled in the art without departing from the spirit and scope of the invention.

What is claimed is:

1. A method for multiplexing a plurality of digital subchannels onto a fixed rate digital channel by forming successive frames of bits comprising the steps of:
   forming said frames so that each frame consists of j i-tuples of bits, i being mathematically predetermined as a function of the rates of each of said digital subchannels and the rate of said fixed rate digital channel,
   setting in each frame each bit in one of said j i-tuples to one predetermined binary digit,
   setting in each frame one fixed bit at one end of each of the other j−1 i-tuples to a predetermined binary digit opposite to the digit set as each bit of said one i-tuple, and
   distributing in each frame in a predetermined pattern in the remaining (i−1)(j−1) bit positions an integral number of bits from each of said subchannels.

2. The method in accordance with claim 1 wherein the frame length ij equals xQ where x is an integer and Q is the least common multiple of the denominators of the subchannel rates normalized by the fixed channel rate to an irreducible ratio, $i \geq \lfloor Q/L \rfloor + 1$ where D is the difference between Q and the number of bits per Q bits required for all of said subchannels, $$x \geq \left\lceil \frac{i(i-1)}{Di-Q} \right\rceil,$$

and j is an integer equal to (xQ)/i.

3. In a multiplier that multiplexes a plurality of digital subchannels onto a fixed rate digital channel by forming successive frames having a fixed number of bits framing apparatus that comprises:
   means for forming each frame so that it consists of j i-tuples of bits, i and j being mathematically predetermined as a function of the rates of each of said digital subchannels and the rate of said fixed rate digital channel,
   said forming means including means for setting in each frame each bit in one of said i-tuples to one predetermined binary digit, means for setting in each frame one fixed bit at one end of each of the other j−1 i-tuples to a predetermined binary digit opposite to the digit set as each bit of said one i-tuple, and means for distributing in each frame in a predetermined pattern in the remaining (i−1)(j−1) bit positions an integral number of bits from each of said subchannels.

4. Framing apparatus in accordance with claim 3 wherein the frame length ij equals xQ where x is an integer and Q is the least common multiple of the denominators of the subchannel rates normalized by the fixed channel rate to an irreducible ratio, $i \geq \lfloor Q/D \rfloor + 1$ where D is the difference between Q and the number of bits per Q bits required for all of said subchannels, $$x \geq \left\lceil \frac{i(i-1)}{Di-Q} \right\rceil,$$

and j is an integer equal to (xQ)/i.

5. A multiplexer for multiplexing a plurality of digital subchannels onto a fixed rate digital channel by forming successive frames of bits comprising:
   a plurality of bit storage means, one storage means associated with each of said subchannels, each storage means for storing a predetermined number of bits from its associated subchannel,
   a selector responsive to a selection code for selecting either a bit stored in any of said plurality of storage means or a fixed binary ONE or ZERO digit,
   output means for forming a multiplexed output bit stream at said fixed rate from bits selected by said selector, and
   means for generating selection codes for each bit in said multiplexed output bit stream, said selection codes repeated in a predetermined pattern so that said multiplexed output bit stream consists of frames that include j i-tuples of bits, i and j being mathematically predetermined as a function of the rates of each of said digital subchannels and the rate of said fixed rate digital channel, said selection codes being such that in one in said i-tuples in each frame each bit selected is one of said fixed binary digits and in each of the other j−1 i-tuples in each frame one fixed bit at one end of the i-tuple is selected as the other of said fixed binary digits, and for the remaining (i−1)(j−1) bit positions in each frame said selection codes being such that an integral number of bits from each of said subchannels are selected.

6. A multiplexer in accordance with claim 5 further comprising:
   means for deriving a clock signal at the least common integral rate of said plurality of subchannels and said fixed channel from a clock signal at said fixed rate,
   said means for generating said selection codes including counting means for repetitively counting clock pulses at said least common integral rate and memory means for generating each selection code as a function of the count of said counting means.

7. A multiplexer in accordance with claim 5 wherein the frame length ij equals xQ where x is an integer and Q is at least common multiple of the denominators of the subchannel rates normalized by the fixed channel rate to an irreducible ratio, $i \geq \lfloor Q/D \rfloor + 1$ where D is the difference between Q and the number of bit per Q bits required for all of said subchannels, $$x \geq \left\lceil \frac{i(i-1)}{Di-Q} \right\rceil,$$

and j is an integer equal to (xQ)/i.

8. A demultiplexer for demultiplexing a multiplexed bit stream from a fixed rate channel onto a plurality of digital subchannels, said multiplexed bit stream being formed from successive frames of bits, each frame including j i-tuples of bits, i and j being mathematically determined as a function of the rates of said digital subchannels and the rate of said fixed rate digital channel, in one of said i-tuples in each frame each bit being one predetermined binary digit and in each of the other j−1 i-tuples in each frame one fixed bit at one end of the i-tuple being an opposite binary digit, the remaining (i−1)(j−1) bit positions in each frame containing an integral number of bits for each of said subchannels, said demultiplexer comprising:

means for determining the start of each frame by detecting from i+1 consecutive bits in said multiplexed bit stream i consecutive bits that are said one predetermined binary digit and one bit that is said opposite binary digit, and means for distributing the bits in said (i−1)(j−1) bit positions in each frame onto said plurality of digital subchannels.

9. A demultiplexer for demultiplexing a multiplexed bit stream from a fixed rate channel onto a plurality of digital subchannels, said multiplexed bit stream being formed from successive frames of bits, each frame including j i-tuples of bits, i and j being mathematically determined as a function of the rates of said digital subchannels and the rate of said fixed rate digital channel, in one of said i-tuples in each frame each bit being one predetermined binary digit and in each of the other j−1 i-tuples in each frame one fixed bit at one end of the i-tuple being an opposite binary digit, the remaining (i−1)(j−1) bit positions in each frame containing an integral number of bits for each of said subchannels, said demultiplexer comprising:

storage means for storing a predetermined number of bits from said multiplexed bit stream, pattern detecting means for determining the start of each frame by detecting from i+1 consecutive bits in said multiplexed bit stream i consecutive bits that are said one predetermined binary digit and one bit that is said opposite binary digit, selection means responsive to selection codes for selecting bits from said storage means, plural output means for forming plural output bit streams onto said digital subchannels from the bits selected from said storage means, and means for generating said selection codes, a selection code generated for each bit in each of said output bit streams, said selection codes repeated in a predetermined pattern for each frame of bits in said multiplexed bit stream, the repeat of said pattern being responsive to the detection of the start of each frame by said pattern detecting means.

10. A digital transmission system for transmitting a plurality of input bit streams on a plurality of digital input subchannels over a fixed rate digital channel by multiplexing at one end of said system said input bit streams to form a multiplexed bit stream and at the other end of said system demultiplexing said multiplexed bit stream to reform said input bit streams on a plurality of output subchannels comprising:

at said one end, means for forming from said plurality of digital subchannels successive frames having a fixed number of bits, each of said frames consisting of j i-tuples, i and j being mathematically predetermined as a function of the rates of each of said digital input subchannels and the rate of said fixed rate digital channel, in one of said i-tuples in each frame each bit in being set to one predetermined binary digit and in each of the other j−1 i-tuples in each frame one fixed bit at one end of the j−1 i-tuple being set to an opposite binary digit, and an integral number of bits from each of said digital input subchannels being distributed in a predetermined pattern among the remaining (i−1)(j−1) bit positions in each frame, and at the other end, means for determining the start of each frame by detecting in i+1 consecutive bits in the multiplexed bit stream i consecutive bits that are said one predetermined binary digit and one bit that is said opposite binary digit, and means for distributing from each frame in a predetermined pattern the bits in said (i−1)(j−1) bit positions to said output subchannels.

* * * * *

UNITED STATES PATENT AND TRADEMARK OFFICE
CERTIFICATE OF CORRECTION

PATENT NO. : 4,617,658

DATED : October 14, 1986

INVENTOR(S) : Stephen M. Walters

It is certified that error appears in the above-identified patent and that said Letters Patent is hereby corrected as shown below:

In the Specification:

Column 5, line 15, "space" should read --spare--.
  Column 7, line 2, "for the 23" should read --of the 23--.
  Column 8, line 11, "470" should read --407--.

In the Claims:

Column 11, line 26, "Q/L" should read --Q/D--.
  Column 11, line 35, "multiplier" should read --multiplexer--.

Signed and Sealed this
Thirtieth Day of December, 1986

Attest:

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,617,658

DATED : October 14, 1986

INVENTOR(S) : Stephen M. Walters

It is certified that error appears in the above-identified patent and that said Letters Patent is hereby corrected as shown below:

In the Claims:

Column 11, line 8, "i being" should read "$\underline{i}$ and $\underline{j}$ being".

Signed and Sealed this

Seventh Day of April, 1987

Attest:

DONALD J. QUIGG

Attesting Officer

Commissioner of Patents and Trademarks